(12) United States Patent
Prohaska et al.

(10) Patent No.: US 10,483,728 B2
(45) Date of Patent: Nov. 19, 2019

(54) ELECTRICAL ENCLOSURE WITH VENTILATION STRUCTURE

(71) Applicant: Eaton Corporation, Cleveland, OH (US)

(72) Inventors: Richard D. Prohaska, Cleveland, TN (US); Jeff B. Ensley, Cleveland, TN (US)

(73) Assignee: Eaton Intelligent Power Limited, Dublin (IE)

( * ) Notice: Subject to any disclaimer, the term of this patent is extended or adjusted under 35 U.S.C. 154(b) by 442 days.

(21) Appl. No.: 15/180,461

(22) Filed: Jun. 13, 2016

(65) Prior Publication Data

US 2017/0150642 A1 May 25, 2017

Related U.S. Application Data

(60) Provisional application No. 62/258,138, filed on Nov. 20, 2015.

(51) Int. Cl.
*H05K 5/02* (2006.01)
*H05K 7/20* (2006.01)
*H02B 1/56* (2006.01)
*H02B 1/28* (2006.01)

(52) U.S. Cl.
CPC ............... *H02B 1/565* (2013.01); *H02B 1/28* (2013.01)

(58) Field of Classification Search
CPC ... H05K 7/20145; H05K 5/0213; H02B 1/565

USPC ........................................................ 454/184
See application file for complete search history.

(56) References Cited

U.S. PATENT DOCUMENTS

| | | | | |
|---|---|---|---|---|
| 3,063,256 A * | 11/1962 | Lamb | ............... | A47F 3/0447 454/193 |
| 6,309,296 B1 * | 10/2001 | Schwenk | ........... | H05K 7/20181 361/695 |
| 6,461,233 B1 * | 10/2002 | Gilkison | ............... | B08B 15/023 454/56 |
| 2004/0198213 A1 * | 10/2004 | Knight | ............... | H04B 1/036 454/184 |
| 2013/0040547 A1 * | 2/2013 | Moore | ............... | H05K 7/20745 454/184 |
| 2014/0231298 A1 * | 8/2014 | DiCianni | ............... | A47K 3/281 206/509 |

* cited by examiner

*Primary Examiner* — Steven B McAllister
*Assistant Examiner* — Ko-Wei Lin
(74) *Attorney, Agent, or Firm* — Benesch Friedlander Coplan & Aronoff LLP (Eaton)

(57) ABSTRACT

An electrical equipment enclosure includes a cabinet defining a storage compartment configured to contain electrical equipment. The cabinet has an array of vent openings communicating the storage compartment with the exterior of the cabinet. The enclosure further includes a box structure having a first open side received over the vent openings, a first closed side opposite the first open side, a second closed side reaching from first open side to the first closed side, and a second open side opposite the second closed side. A baffle is located in the box structure between the first open side and the second open side.

20 Claims, 5 Drawing Sheets

ELECTRICAL ENCLOSURE WITH VENTILATION STRUCTURE

RELATED APPLICATIONS

This application claims the priority benefit of provisional U.S. patent application Ser. No. 62/258,138, filed Nov. 20, 2015, which is incorporated by reference.

TECHNICAL FIELD

This technology relates to an enclosure for containing electrical equipment.

BACKGROUND

Electrical equipment may be installed in an enclosure. Such an enclosure may be mounted on a wall, either indoors or outdoors, and may be configured for ventilation.

SUMMARY

An electrical equipment enclosure includes a cabinet defining a storage compartment configured to contain electrical equipment. The cabinet has at least one vent opening communicating the storage compartment with the exterior of the cabinet. The enclosure further includes a box structure having a first open side received over the vent opening. The box structure further has a first closed side opposite the first open side, a second closed side reaching from first open side to the first closed side, and a second open side opposite the second closed side. A baffle is located in the box structure between the first open side and the second open side.

DETAILED DESCRIPTION

Figure 1:
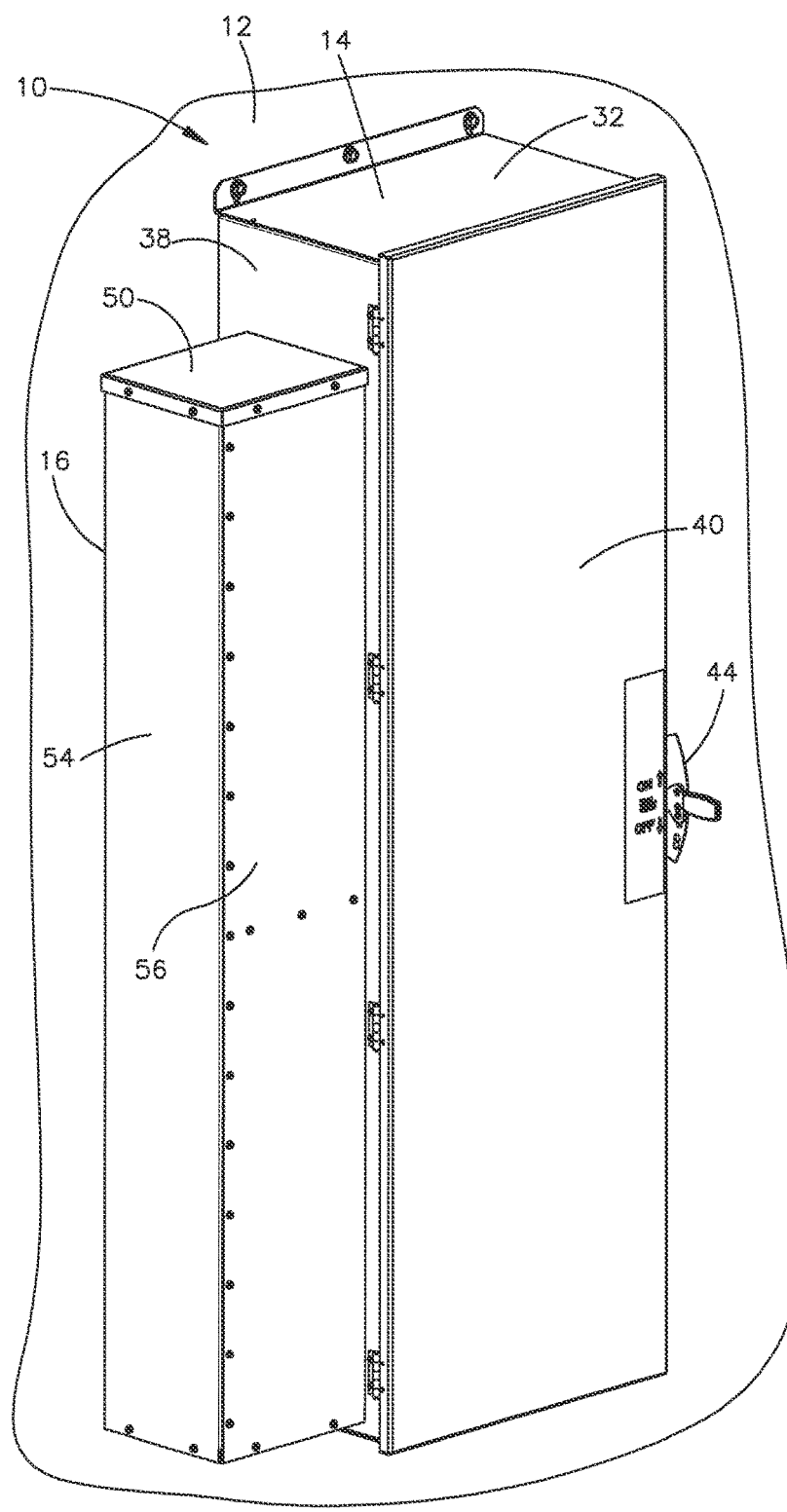
FIG. 1 is a front perspective view of one embodiment of an electrical enclosure 10 mounted on an exterior building wall 12.

The apparatus illustrated in the drawings includes parts that are examples of the elements recited in the claims. The illustrated apparatus thus includes examples of how any person skilled in the art can make and use the claimed invention. It is described here to meet the enablement and best mode requirements of the patent statute without imposing limitations that are not recited in the claims.

Figure 2:
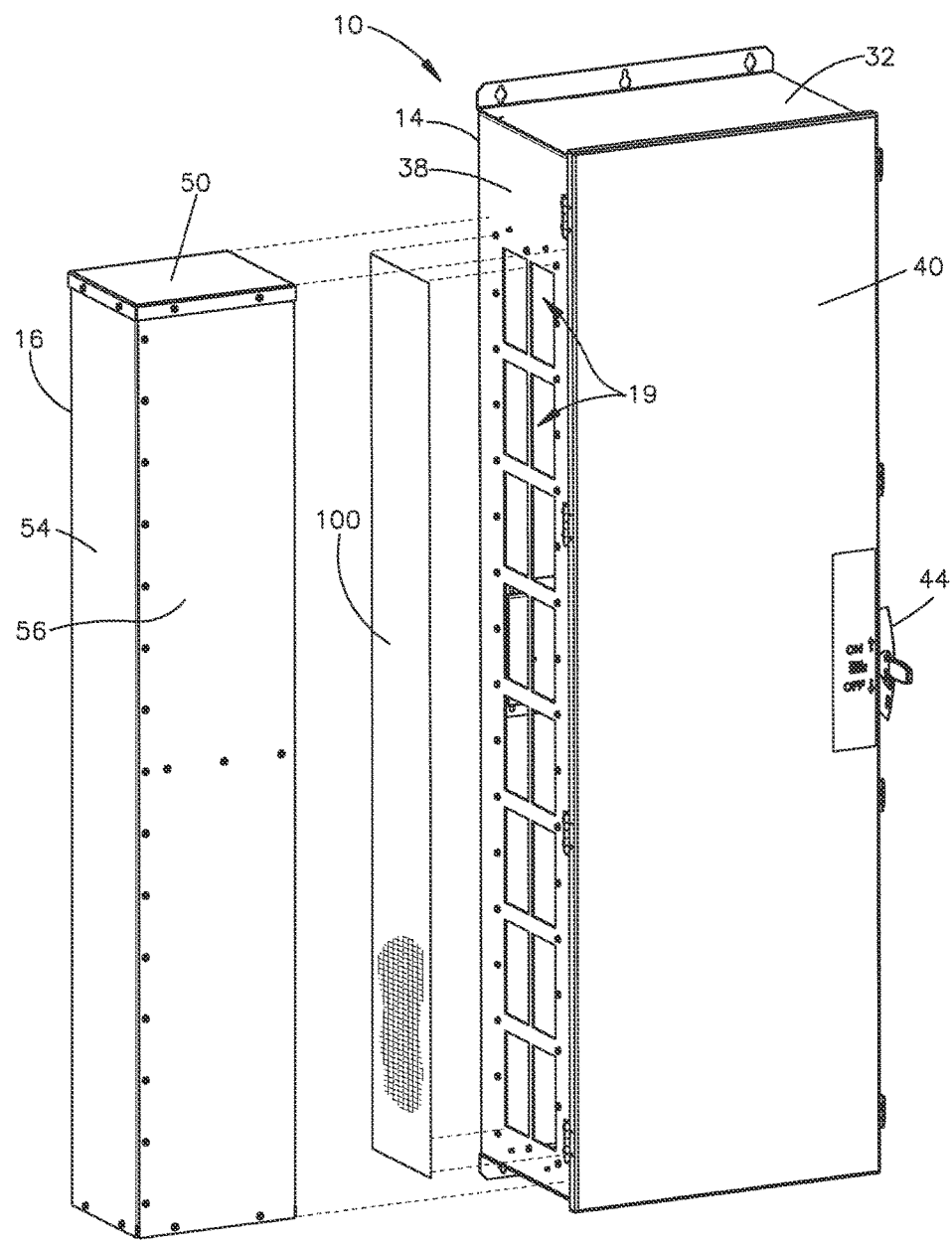
FIG. 2 is an exploded front perspective view of parts of the enclosure 10 of FIG. 1.

As shown in FIG. 1, an electrical enclosure 10 is mounted on a wall such as, for example, an exterior building wall 12. The enclosure 10 includes a cabinet 14 and a baffle box 16. The cabinet 14, which is configured to contain electrical equipment such as circuit switching devices or the like, has vent openings 19 (FIG. 2). The baffle box 16 is received over the vent openings 19 in the cabinet 14, and has an outlet opening 21 (FIG. 3) communicating the vent openings 19 with the exterior environment.

The cabinet 14 in the illustrated example includes a rectangular wall panel structure defining a storage compartment 25 (FIG. 4) for containing the electrical equipment. The wall panel structure includes a rear wall panel 30, top and bottom wall panels 32 and 34, and two opposite side wall panels 36 and 38. A door 40 reaches across an open front side 41 of the storage compartment 25.

Figure 3:
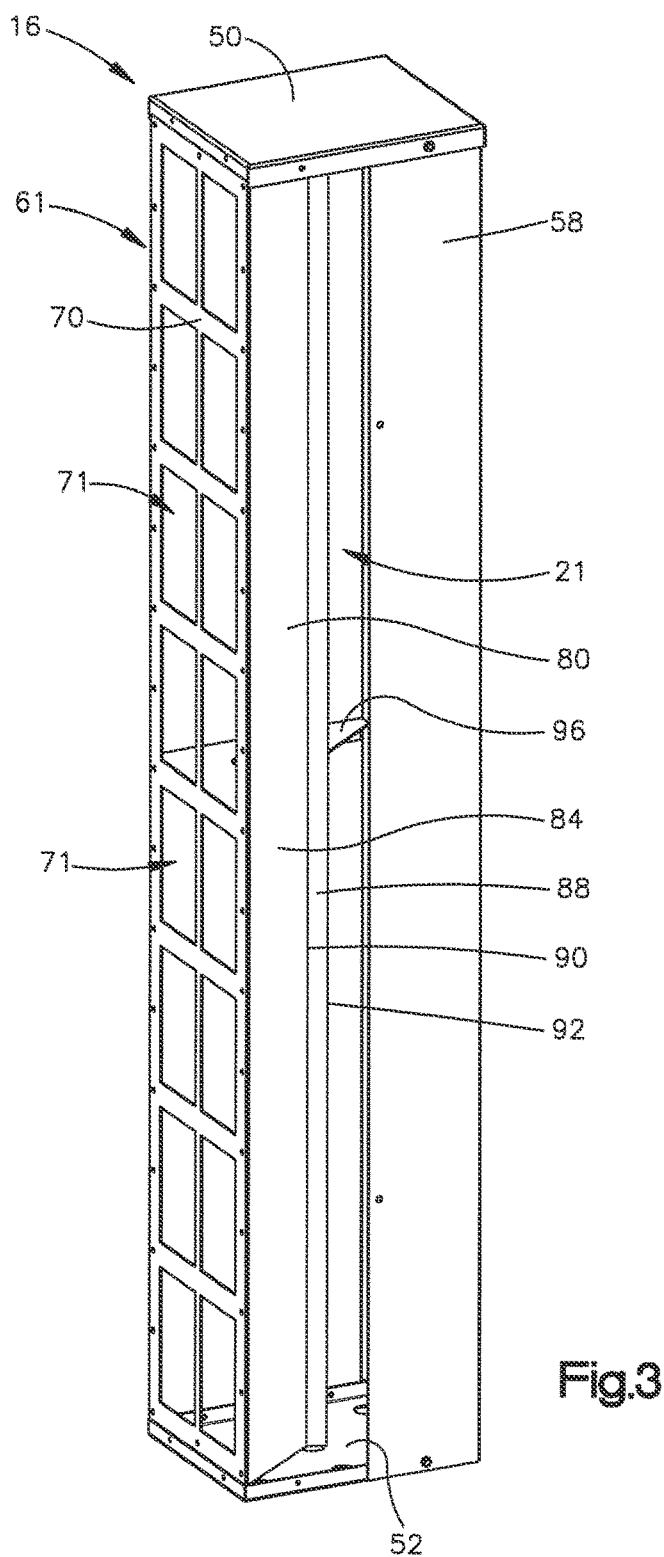
FIG. 3 is a rear perspective view of the baffle box 16 shown in FIG. 1.

In the illustrated example, the cabinet 14 is configured to contain switchable electrical equipment, such as circuit breakers. The first side wall panel 36 supports an operating handle assembly 44 that is configured to operate accordingly. The second side wall panel 38 includes the vent openings 19. In the given example, the vent openings 19 all have the same rectangular shape and size, and are arranged in adjacent pairs that are equally spaced apart in two vertical rows, as shown in FIG. 3. Other shapes, sizes, and patterns are possible in alternative embodiments.

The baffle box 16 in the illustrated example also has a rectangular wall panel structure. This includes top and bottom wall panels 50 and 52, an outer side wall panel 54, and front and rear side wall panels 56 and 58. The top wall panel 50 is imperforate, and thus provides the box 16 with a closed top. The bottom wall panel 52 has drain openings 59. The outer side wall panel 54 is imperforate to provide a closed outer side of the box 16, and faces across the inside of the box 16 toward an open inner side 61. The front side wall panel 56 is imperforate to provide a closed front side of the box 16. The rear side wall panel 58 also is imperforate, but reaches only partly from the outer side wall panel 54 to the open inner side 61. This provides the box 16 with an open rear side at which the outlet opening 21 reaches from the outer side wall panel 58 to the open inner side 61.

As best shown in FIG. 3, the wall panel structure of the box 16 further includes a frame structure 70 at the open inner side 61. The frame structure 70 has an array of vent openings 71 with the same size, shape, and arrangement as the vent openings 19 in the cabinet 14. However, as with the vent openings 19 in the cabinet 14, other shapes, sizes, and patterns of vent openings in the baffle box 16 are possible in alternative embodiments. A greater or lesser number of vent openings, as well as only a single vent opening, also could be provide at the cabinet 14 and/or the baffle box 16 in alternative embodiments.

Figure 4:
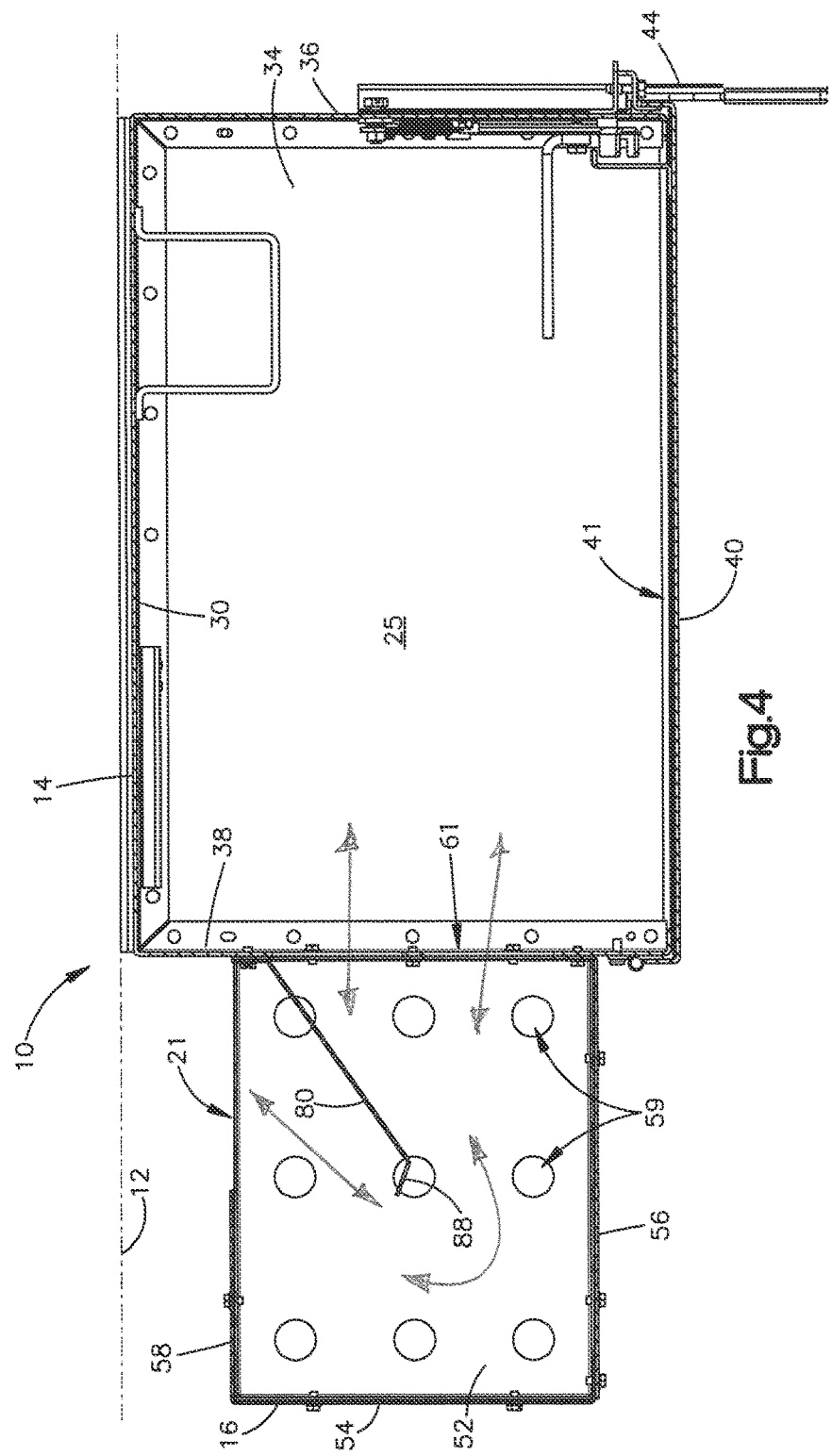
FIG. 4 is a sectional view of the enclosure 10 of FIG. 1.
Figure 5:
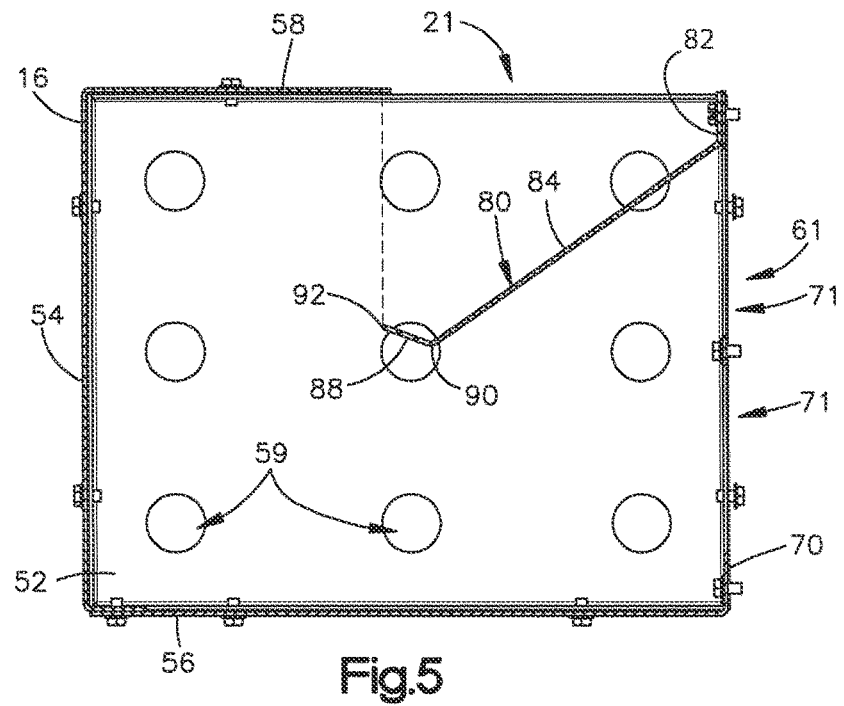
FIG. 5 is an enlarged sectional view of the baffle box 16 shown in FIG. 4.

As best shown in FIGS. 4 and 5, the baffle box 16 further includes an inner wall panel configured as a baffle 80. The baffle 80 in the illustrated example reaches fully or substantially fully throughout the height of the box 16 between the top and bottom wall panels 50 and 52, and partially across the width of the box 16 between the open and closed sides 61 and 54.

A rear flange section 82 (FIG. 5) of the baffle 80 is fastened to the frame structure 70 beside the outlet opening 21. A major section 84 of the baffle 80 has a linear cross-sectional configuration, and projects from the rear flange section 82 diagonally across the inside of the box 16. A front flange section 88 of the baffle 80 also has a linear cross-section. The front flange section 88 projects from a corner 90 at the inner end the major section 84, and reaches diagonally back outward 16 across the inside of the box 16. The front flange section 88 terminates at a free end 92 spaced inward from the four sides of the box 16. Preferably, the baffle 80 thus reaches fully across and at least a short distance past the outlet opening 21, as shown for example in FIG. 5.

Figure 6:
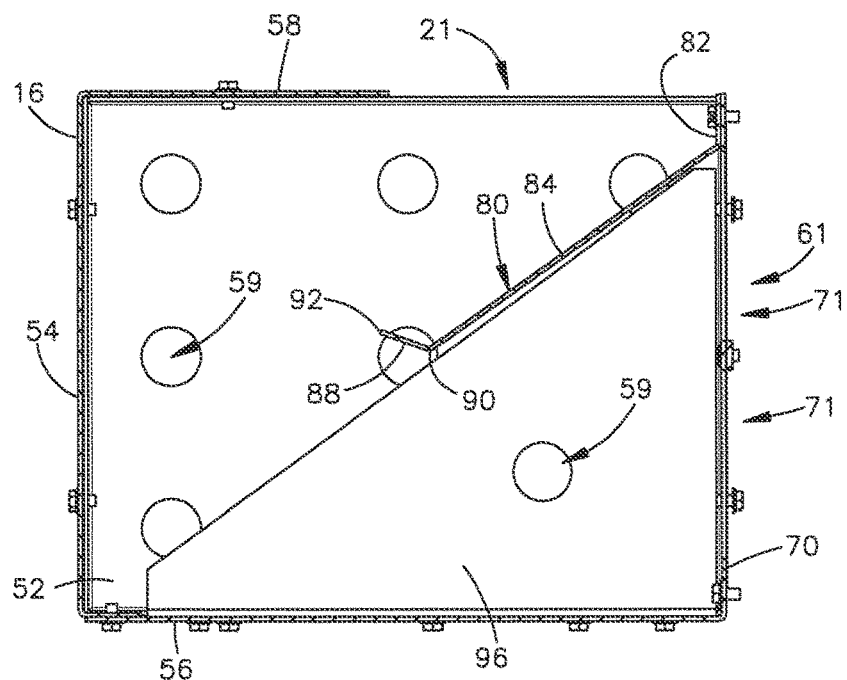
FIG. 6 is a different enlarged sectional view of the baffle box 16 shown in FIG. 4.

In addition to the baffle 80, the box 16 in the given example also includes one or more shelf structures 96 (FIGS. 3 and 6). Such shelf structures 96 are spaced apart vertically between the top and bottom wall panels 50 and 52 to collect debris that might otherwise accumulate at the bottom of the baffle box 16.

The baffle box 16 is mounted on the second side wall 38 of the cabinet 14. The open side 61 of the box 16 fully surrounds the array of vent openings 19 in the cabinet 14, and the vent openings 71 in the box 16 are aligned with the vent openings 19 in the cabinet 14. A screen 100 is captured between frame structure 70 of the box 16 and the second side wall 38 of the cabinet 14. The screen 100 reaches fully across the aligned vent openings 19 and 71.

As indicated by the arrows shown in FIG. 4, the baffle box 16 and the baffle 80 together define a convoluted air flow path flowing outward from the vent openings 19, 71 to the outlet opening 21 for ventilating heat generated by the electrical equipment mounted in the storage compartment 25. The baffle box 16 and the baffle 80 likewise define a corresponding convoluted air flow path flowing oppositely inward from the outlet opening 21 to the vent openings 19, 71. This helps to block water, debris, and other environmental contaminants from entering the storage compartment 25 through the vent openings 19. Additionally, the outlet opening 21 at the rear side 58 of the box 16 faces toward the building wall 12 in close proximity to the building wall 12, as indicated for example in FIG. 4, which further helps to block the ingress of undesirable fluids and materials.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that do not differ from the literal language of the claims, as well as equivalent examples with insubstantial differences from the literal language of the claims.

What is claimed is:

1. An electrical equipment enclosure, comprising:
   a cabinet defining a storage compartment configured to contain electrical equipment, the cabinet having a vent opening communicating the storage compartment with an exterior of the cabinet;
   a box structure having a first open side received over the vent opening, a first closed side opposite the first open side, a second closed side extending from the first open side to the first closed side, and a second open side opposite the second closed side; and
   a baffle located in the box structure between the first open side and the second open side, wherein the baffle is joined to the box structure at a corner where the first open side intersects the second open side, reaches inward from the corner in a direction diagonally toward an opposite corner where the first closed side intersects the second closed side, and has a free end spaced from the sides of the box structure, whereby the baffle is interposed diagonally between the first open side and the second open side such that the baffle and the box structure define a convoluted air flow path from the vent opening through the first open side of the box structure, inward through the box structure from the first open side toward and around the free end of the baffle, and further through the box structure from the free end of the baffle to the second open side to ventilate heat from the storage compartment and to inhibit debris from passing through the box structure oppositely along the convoluted air flow path and entering the storage compartment through the vent opening.

2. An electrical equipment enclosure as defined in claim 1, wherein the second open side of the box structure has an outlet opening reaching partially across the second open side of the box, and the baffle reaches across and beyond the outlet opening.

3. An electrical equipment enclosure as defined in claim 1, wherein the baffle has a major section reaching diagonally across the box structure.

4. An electrical equipment enclosure as defined in claim 1, wherein the baffle has a corner at the free end, and further has a flange section projecting diagonally from the corner toward the second open side of the box structure.

5. An electrical equipment enclosure as defined in claim 1, wherein the box structure has an imperforate top wall panel, and further has a bottom wall panel with drain openings.

6. An electrical equipment enclosure as defined in claim 1, wherein the cabinet has a door reaching across an open front side of the storage compartment, the cabinet further has a rear wall panel facing outward from the cabinet in a rearward direction, and the second open side of the box structure faces outward from the box structure in the rearward direction.

7. An electrical equipment enclosure as defined in claim 6, wherein the cabinet is mounted on a building wall with the rear wall panel facing the building wall.

8. An electrical equipment enclosure as defined in claim 1, wherein the box structure includes horizontal shelf structures spaced apart vertically from each other within the box structure.

9. An electrical equipment enclosure as defined in claim 8, wherein the baffle is vertically elongated, and the shelf structures are located vertically along a common horizontal side of the baffle.

10. An electrical equipment enclosure as defined in claim 8, wherein the baffle reaches across the box structure diagonally between the vent opening and the outlet opening, and the shelf structures are located between the baffle and the vent opening.

11. An electrical equipment enclosure as defined in claim 8, wherein the shelf structures have triangular shapes reaching diagonally across the box structure.

12. An electrical equipment enclosure as defined in claim 8, wherein the shelf structures have drain openings.

13. An electrical equipment enclosure, comprising:
    a cabinet defining a storage compartment configured to contain electrical equipment, the cabinet having a vent opening communicating the storage compartment with an exterior of the cabinet, a door reaching across an open front side of the storage compartment, and a rear wall panel facing outward from the cabinet in a rearward direction;
    a box structure having a first open side received over the vent opening, a first closed side opposite the first open side, a second closed side extending from the first open side to the first closed side, and a second open side opposite the second closed side, the second open side having an outlet opening facing outward from the box structure in the rearward direction; and
    a baffle located in the box structure between the first open side and the second open side, wherein the baffle is joined to the box structure at a corner where the first open side intersects the second open side, reaches inward from the corner in a direction diagonally toward an opposite corner where the first closed side intersects the second closed side, and has a free end spaced from the sides of the box structure, whereby the baffle is interposed diagonally between the first open side and the second open side such that the baffle and the box structure define a convoluted air flow path from the vent opening through the first open side of the box structure, inward through the box structure from the first open side toward and around the free end of the baffle, and further from the free end of the baffle through the box structure to the second open side, to ventilate heat from the storage compartment and to inhibit debris from passing through the box structure oppositely along the convoluted air flow path and entering the storage compartment through the vent opening.

14. An electrical equipment enclosure as defined in claim 13, wherein the cabinet is mounted on a building wall with the rear wall panel facing the building wall.

15. An electrical equipment enclosure as defined in claim 13, wherein the box structure includes shelf structures spaced apart vertically from each other within the box structure.

16. An electrical equipment enclosure as defined in claim 15, wherein the baffle is vertically elongated, and the shelf structures are located vertically along a common horizontal side of the baffle.

17. An electrical equipment enclosure as defined in claim 15, wherein the baffle reaches across the box structure diagonally between the vent opening and the outlet opening, and the shelf structures are located between the baffle and the vent opening.

18. An electrical equipment enclosure as defined in claim 15, wherein the shelf structures have triangular shapes reaching diagonally across the box structure.

19. An electrical equipment enclosure as defined in claim 15, wherein the shelf structures have drain openings.

20. An electrical equipment enclosure as defined in claim 15, wherein the box structure has an imperforate top wall panel, and further has a bottom wall panel with drain openings.

* * * * *